Figure 1:
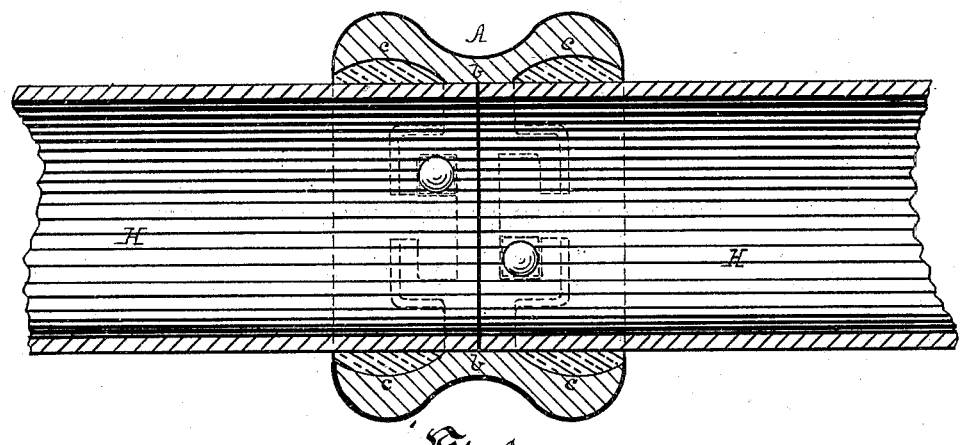

(No Model.)

E. C. CONVERSE.
TUBE COUPLING.

No. 283,971. Patented Aug. 28, 1883.

Witnesses.
Jn Cooke
F. G. Kay

Inventor.
Edmund C. Converse
by James I. Kay
Attorney

UNITED STATES PATENT OFFICE.

EDMUND C. CONVERSE, OF PITTSBURG, PENNSYLVANIA.

TUBE-COUPLING.

SPECIFICATION forming part of Letters Patent No. 283,971, dated August 28, 1883.

Application filed February 20, 1883. (No model.)

*To all whom it may concern:*

Be it known that I, EDMUND C. CONVERSE, of Pittsburg, in the county of Allegheny and State of Pennsylvania, have invented a new and useful Improvement in Tube-Couplings, (Case A;) and I do hereby declare the following to be a full, clear, and exact description thereof.

My invention relates to couplings for metal tubing, its object being to form a coupling whereby the several lengths of tubing can be connected without so weakening the tubing as where a screw-thread is cut into it to form connection by means of a screw-threaded socket. Where such a thread is cut into the tubing, it is so weakened at the point threaded that to enable it to withstand the necessary internal pressure, or any longitudinal strain or lateral bending strain, the tubing is formed much thicker than necessary for the unthreaded portion of the tubing. It is evident that this increased thickness of the tubing necessarily increases not only its cost, but, on account of its increased weight, also adds much to the expense of transportation. For this reason a coupling by which the lighter metal tubing can be securely connected, so as to withstand not only the internal pressure of the water or other liquid, compressed air, or gas confined in or passing through it, but also any longitudinal strain consequent to the expansion or contraction of the tubing or lateral bending strain, is much sought after.

In Letters Patent granted to me January 10, 1882, is shown and described a coupling collar or sleeve for use with this light metal tubing, which has been found efficient under ordinary pressure; but the object of the present invention is to provide a coupling which will form a secure and efficient connection for such tubing when subjected to any pressure or strain which the tubing is adapted to withstand, thus providing a coupling specially adapted to high pressures.

My invention consists, essentially, in combining with the tubing having one or more lugs or similar connecting devices a coupling collar or sleeve provided with annular calking-recesses at each end and proper seats or recesses within the coupling-collar and below the mouths of the annular calking-recesses, within which seats or recesses the lugs on the tubing engage, whereby after the connection between the tubing and collar has been effected the annular recesses may be filled and calked, and the calking material will lock the lugs in their seats and surround the tubing above the locking devices.

It also consists in providing this coupling-collar with an inner central face, within which the ends of the tubing meet, so that after the tubing has been connected with the coupling by means of the locking lugs and seats and the calking material before referred to their ends will be supported against internal pressure strain by means of this inner central face.

To enable others skilled in the art to make and use my invention, I will describe its construction and manner of use, referring for that purpose to the accompanying drawings, in which—

Figure 2:
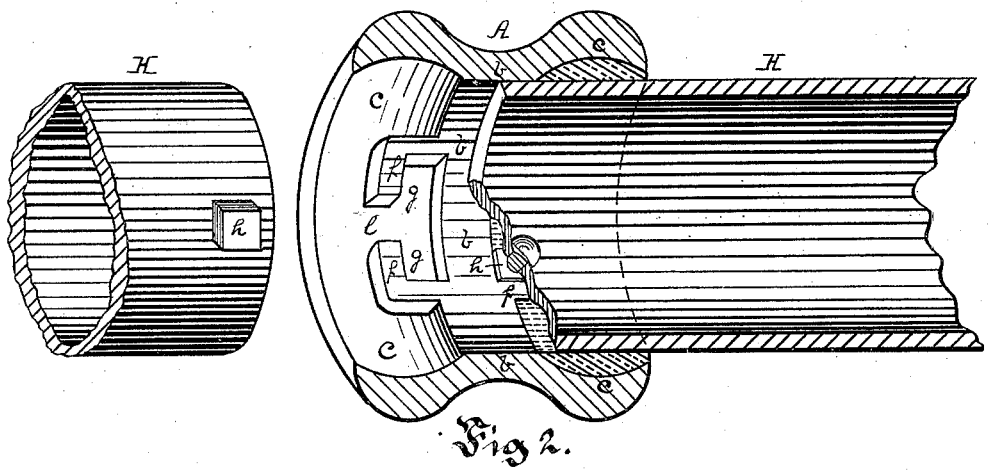

Figure 1 is a sectional view of a coupling-collar and tubing, showing the locking devices in dotted lines below the tubing; and Fig. 2 is a perspective sectional view, partly broken away, of the coupling-collar, showing one tubing connected therein, and the other tubing in full lines ready to enter the collar.

Like letters of reference indicate like parts in each.

The coupling collar or sleeve A is preferably cast to shape, though it may be rolled or forged or turned, if desired. It is provided with the inner face, *b*, midway between the ends. This inner face corresponds in diameter to the outer diameter of the tubing to be connected, and is of sufficient width to give a strong brace to the ends of the tubing, around which it fits neatly, being formed slightly tapering, if desired, so as to compress or bind the ends of the tubing around their entire circumference, thus rounding up the tubing, if bent out of shape, and enabling the body of the collar to support it against internal pressure strain. On either side of this inner face, *b*, are the annular calking-recesses *c* for the reception of lead or other calking or packing material, these calking-recesses being preferably formed inwardly flaring, being of larger diameter at the base or between the base and the mouth than at the mouth, and therefore holding the calking material more securely in place and preventing its displacement from any internal pressure strain. On either side of the inner face, *b*, are the locking-seats *g*, these locking-seats being formed below the mouth of the calking-recesses on either side of said inner face. The seat preferred by me is formed of a rib, *f*, extending along the calking-recess, back of which the body of the collar is hollowed out or depressed to form the seat *g* for the reception of the lug *h* on the tube-section H, the lug catching behind this rib, and thus securely locking the tubing within the collar against longitudinal or drawing strain. The seat *g*, between the rib *f* and the inner face, *b*, corresponds in width to the width of the locking-lug *h* on the tubing, so that when the lug enters this depression or seat it is held therein against longitudinal motion in either direction. The seat is preferably formed with a space, *l*, through which the lug on the tubing passes, and a rib, *f*, on either side of this space, so that the tubing can be turned in either direction to lock it within the collar. If desired, the ribs *f* may extend across the locking-recesses at a slight angle, so that the lugs on the pipe may travel by the incline so formed and press the ends of the tube-section connected against each other, as hereinafter described. The number of locking lugs and seats formed on each end of the tubing and in the collar will depend on the diameter of the tubing to be connected, two such locking devices at each end being generally sufficient, except in connecting large tubing, when three or more may be employed. The lugs *h* on the tube-sections H are preferably riveted thereto, as this does not require the reheating of the tubing, though they may be welded thereto or expanded therefrom, neither method injuriously affecting the tubing, as the lugs are supported within their seats and the calking material enters within the seats back of the lugs and entirely fills the calking-recesses above the locking-connection, so that it prevents any leakage, even where there is an imperfection at the lugs. The lugs are formed on the tubing at such distance from the end thereof that when connected in the collar the ends of the tubing will extend to the center of the inner face, *b*, of the collar, and that the ends of the two sections connected therein will meet within the inner face of the collar. As the lugs correspond in width to the width of the seats *g*, they are held by these seats against longitudinal motion in either direction, and can consequently be brought so as to enter the seat without pressing the end of the tubing so tightly against the end of the other tube-section connected in the collar as to prevent the entrance of the lugs into their seats.

In connecting tubing by my improved coupling collar or sleeve, the ends of the tube-sections are inserted into the collar, the lugs *h* passing through the spaces *l*, and the tubing is then turned within the collar, either to the right or left, so as to lock the lugs behind the ribs *f*, the tubing being thus held within the collar against longitudinal or drawing strain. The ends of the two tube-sections meet within the inner face, *b*, of the collar, and where the ribs *f* extend across the collar at a slight angle the tube-sections can be forced tightly against each other within this inner face, *b*. Where the tubing cannot be turned for any reason, the collar can be turned on it, thus making the locking-connection. The melted lead or other calking material is then poured into the annular recesses *c*, and calked or solidified in the usual manner, and the coupling is made. The calking material, as it is poured into the annular recesses, enters the spaces *l* between the ribs *f* and around the lugs *h* within the locking-seats *g*, and thus locks the lugs within the seats and fills the calking-recesses between the locking-seats and the mouths or ends of the collar, entirely surrounding the tubing in this space above the locking-connection. It thus prevents any leakage at the coupling, even though the ends of the tubing do not meet closely within the central inner face, *b*, or there is any imperfection at the lug through which the water or other liquid, compressed air, or gas might escape, forming an absolutely secure joint for this light metal tubing, which has been tested to a pressure of over one thousand pounds to the square inch without leaking. The locking-connection within the collar also secures the coupling against the longitudinal or drawing strain consequent to the contraction and expansion of the metal in different temperatures, and as the body of the tubing is not weakened at or near the ends of the collar (the lugs being below the calking material and protected by it) there is no more liability of injury to it from lateral or bending strain at the coupling than in the body of the tubing. As the ends of the tubing are arranged to meet within the inner face of the collar, I obtain a smooth inner surface to the tubing at the joint, so that I do away with the friction caused by the usual threaded joint or coupling, and for this reason require less power to force the fluid through the tubing. As the ends of the tubing meet within the inner face of the collar, they are supported from internal pressure strain by the body of the collar.

What I claim as my invention, and desire to secure by Letters Patent, is—

1. In couplings for tubing, the combination, with tubing having one or more lugs or other connecting devices at or near each end thereof, of a coupling collar or sleeve provided on the interior with corresponding locking-seats for the reception of the lugs on the tubing, and annular calking-recesses between such locking-seats and the ends of the collar, substantially as and for the purposes set forth.

2. In couplings for tubing, the combination, with tubing having one or more lugs or other connecting devices at or near each end thereof, of a coupling collar or sleeve provided with an inner central face, within which the ends of the tubing are adapted to meet, corresponding locking seat or seats on each side of said inner face for the reception of the lugs on the tubing, and annular calking-recesses between such locking-seats and the ends of the collar, substantially as and for the purposes set forth.

In testimony whereof I, the said EDMUND C. CONVERSE, have hereunto set my hand.

EDMUND C. CONVERSE.

Witnesses:
 JAMES B. MURRAY,
 CHAS. C. DORR.